(12) United States Patent
Umimura

(10) Patent No.: US 10,534,423 B2
(45) Date of Patent: Jan. 14, 2020

(54) INFORMATION PROCESSING APPARATUS CONFIGURED TO SELECT SWAP AREA BASED ON POWER MODE, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Kiyokazu Umimura, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 15/625,128

(22) Filed: Jun. 16, 2017

(65) Prior Publication Data

US 2017/0371398 A1   Dec. 28, 2017

(30) Foreign Application Priority Data

Jun. 22, 2016   (JP) ................................. 2016-123989

(51) Int. Cl.
*G06F 1/32* (2019.01)
*G06F 1/3234* (2019.01)
*G06F 1/3287* (2019.01)
*G06F 3/06* (2006.01)
*H04N 1/00* (2006.01)

(52) U.S. Cl.
CPC ............ *G06F 1/3284* (2013.01); *G06F 1/325* (2013.01); *G06F 1/3287* (2013.01); *G06F 3/0625* (2013.01); *G06F 3/0634* (2013.01); *G06F 3/0685* (2013.01); *H04N 1/00885* (2013.01); *Y02D 10/159* (2018.01); *Y02D 10/171* (2018.01)

(58) Field of Classification Search
None
See application file for complete search history.

(56) References Cited

U.S. PATENT DOCUMENTS

| | | | |
|---|---|---|---|
| 2008/0162914 A1* | 7/2008 | Adrangi | G06F 9/441 713/2 |
| 2011/0099339 A1 | 4/2011 | Hagiwara | |
| 2011/0320801 A1* | 12/2011 | Nimura | G06F 9/4418 713/2 |
| 2013/0326252 A1* | 12/2013 | Ise | G06F 1/3234 713/323 |
| 2014/0317373 A1* | 10/2014 | Kim | G11C 16/349 711/167 |

(Continued)

FOREIGN PATENT DOCUMENTS

| | | |
|---|---|---|
| CN | 101185048 A | 5/2008 |
| CN | 102063178 A | 5/2011 |
| JP | 2011095916 A | 5/2011 |

OTHER PUBLICATIONS

Office Action issued in Chinese Application No. 201710451595.6 dated Nov. 8, 2019. English translation provided.

*Primary Examiner* — Kim Huynh
*Assistant Examiner* — Danny Chan
(74) *Attorney, Agent, or Firm* — Rossi, Kimms & McDowell LLP

(57) ABSTRACT

An information processing apparatus includes two storage devices, a semiconductor storage device and a magnetic storage device, and controls which of the storage devices is to provide a swap area corresponding to a power saving mode set in accordance with a user input.

9 Claims, 9 Drawing Sheets

(56) References Cited

U.S. PATENT DOCUMENTS

| | | | |
|---|---|---|---|
| 2014/0337610 A1* | 11/2014 | Kawano | G06F 9/441 |
| | | | 713/2 |
| 2015/0324119 A1* | 11/2015 | Romanovsky | G06F 12/08 |
| | | | 711/103 |
| 2016/0055097 A1* | 2/2016 | Ki | G06F 12/0871 |
| 2016/0098203 A1* | 4/2016 | Chang | G06F 12/08 |
| | | | 711/156 |
| 2017/0075387 A1* | 3/2017 | Hou | G06F 3/0425 |
| 2017/0177870 A1* | 6/2017 | Hildebrand | G06F 9/4418 |
| 2017/0262038 A1* | 9/2017 | Noro | G06F 1/163 |

* cited by examiner

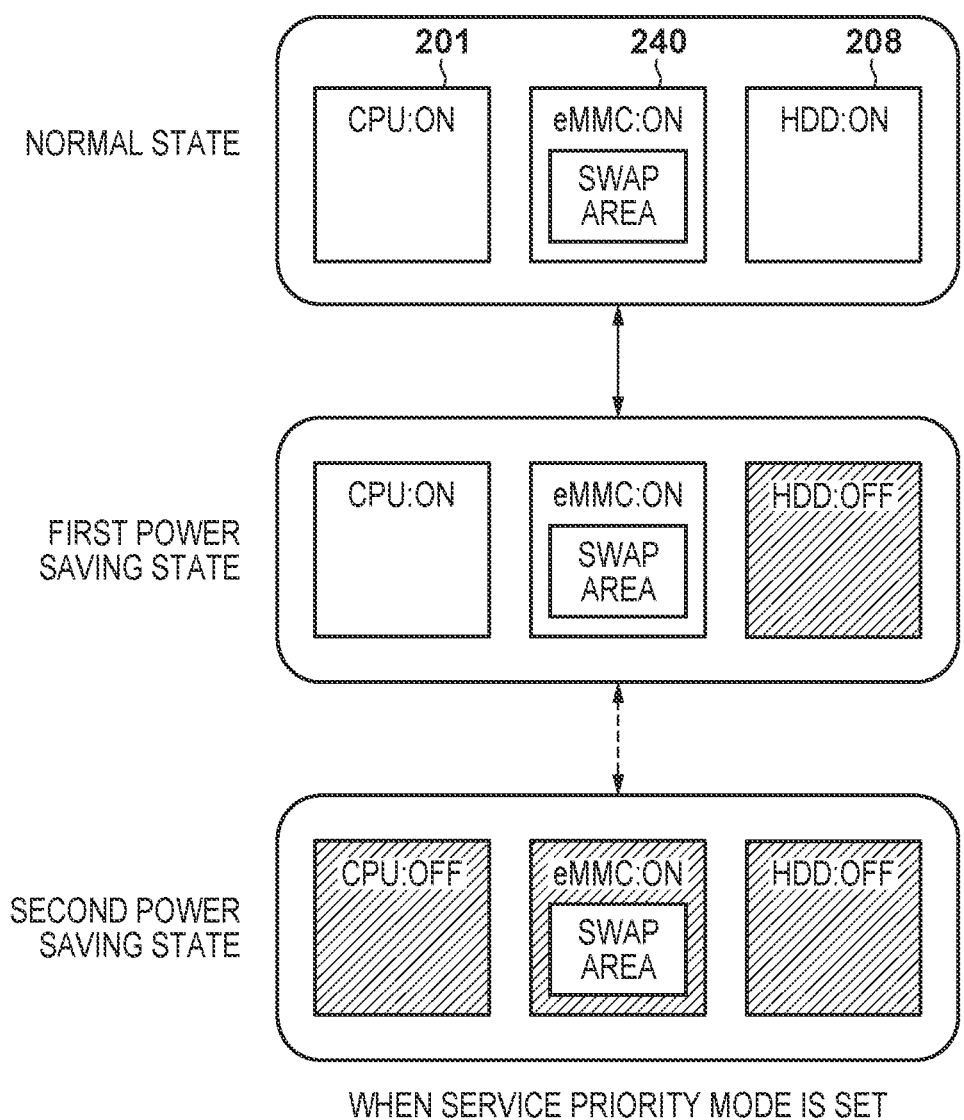

INFORMATION PROCESSING APPARATUS CONFIGURED TO SELECT SWAP AREA BASED ON POWER MODE, METHOD OF CONTROLLING THE SAME, AND NON-TRANSITORY COMPUTER-READABLE STORAGE MEDIUM

BACKGROUND OF THE INVENTION

Field of the Invention

The present invention relates to an information processing apparatus that can operate in a plurality of power-saving states, a method of controlling the same, and a non-transitory computer-readable storage medium.

Description of the Related Art

In recent years, with increasing environmental awareness among users, an image processing apparatus transitions to a power saving state by stopping the power supply to some parts of the image processing apparatus when the apparatus is not continuously used for a predetermined time so as to reduce, power consumption in a range which does not impair user convenience. For example, if the image processing apparatus transitions to a power saving state, the power supply to a printer portion and a scanner portion is stopped to reduce power consumption.

Additionally, power saving is also being advanced in a controller that controls the image processing apparatus. In particular, since an HDD (Hard Disk Drive) which is a magnetic storage device has high power consumption, the power consumption of the controller can be reduced greatly by stopping the power supply during a power saving state. In general, however, a swap area which is an area for reading out and saving some of the contents in use from a main memory is provided in the HDD. Hence, if the power supply to the HDD is stopped, the swap area becomes inaccessible, and the application software operating on the controller can become unexecutable problematically.

Therefore, there is an image processing apparatus that includes a plurality of different types of auxiliary storage devices such as a magnetic storage device and a semiconductor storage device. The magnetic storage device has no rewriting lifetime limit but has high power consumption as its feature, and the semiconductor storage device has low power consumption but has a rewriting lifetime limit as its feature. Japanese Patent Laid-Open No. 2011-95916 proposes a technique of reducing power consumption by incorporating a plurality of storage devices and turning off the power supply to an HDD by providing a swap area in the storage area of an SSD (Solid State Drive) which is a semiconductor storage device when operating in a power saving state.

SUMMARY OF THE INVENTION

One of the aspects of the present invention enables realization of a mechanism that reduces the transition time between a power saving state and a normal state while increasing a power-saving effect by suitably switching, in accordance with the stage of a power saving state set by a user, the storage device which provides a swap area.

One aspect of the present invention provides an information processing apparatus that has a plurality of power saving modes having different amounts of power consumption, comprising: a semiconductor storage device; a magnetic storage device; a setting unit configured to set one of the plurality of power saving modes in accordance with a user input; and a control unit configured to control, in accordance with a power saving mode set by the setting unit, which of the semiconductor storage device and the magnetic storage device is to provide a swap area at the time of activation of the information processing apparatus.

Another aspect of the present invention provides a control method of an information processing apparatus that includes a semiconductor storage device and a magnetic storage device and has a plurality of power saving modes having different amounts of power consumption, comprising: setting one of the plurality of power saving modes in accordance with a user input, and controlling, in accordance with the set power saving mode, which of the semiconductor storage device and the magnetic storage device is to provide a swap area at the time of activation of the information processing apparatus.

Still another aspect of the present invention provides a non-transitory computer readable storage medium storing a computer program for causing a computer to execute each step of a control method of an information processing apparatus that includes a semiconductor storage device and a magnetic storage device and has a plurality of power saving modes having different amounts of power consumption, the method comprising: setting one of the plurality of power saving modes in accordance with a user input, and controlling, in accordance with the set power saving mode, which of the semiconductor storage device and the magnetic storage device is to provide a swap area at the time of activation of the information processing apparatus.

Further features of the present invention will be apparent from the following description of exemplary embodiments with reference to the attached drawings.

BRIEF DESCRIPTION OF THE DRAWINGS

FIGS. 7A and 7B are views showing examples of power states of the image processing apparatus.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<System Configuration>

The first embodiment of the present invention will be described below. First, the system configuration of an information processing system according to this embodiment will be described with reference to FIG. 1.

Figure 1:
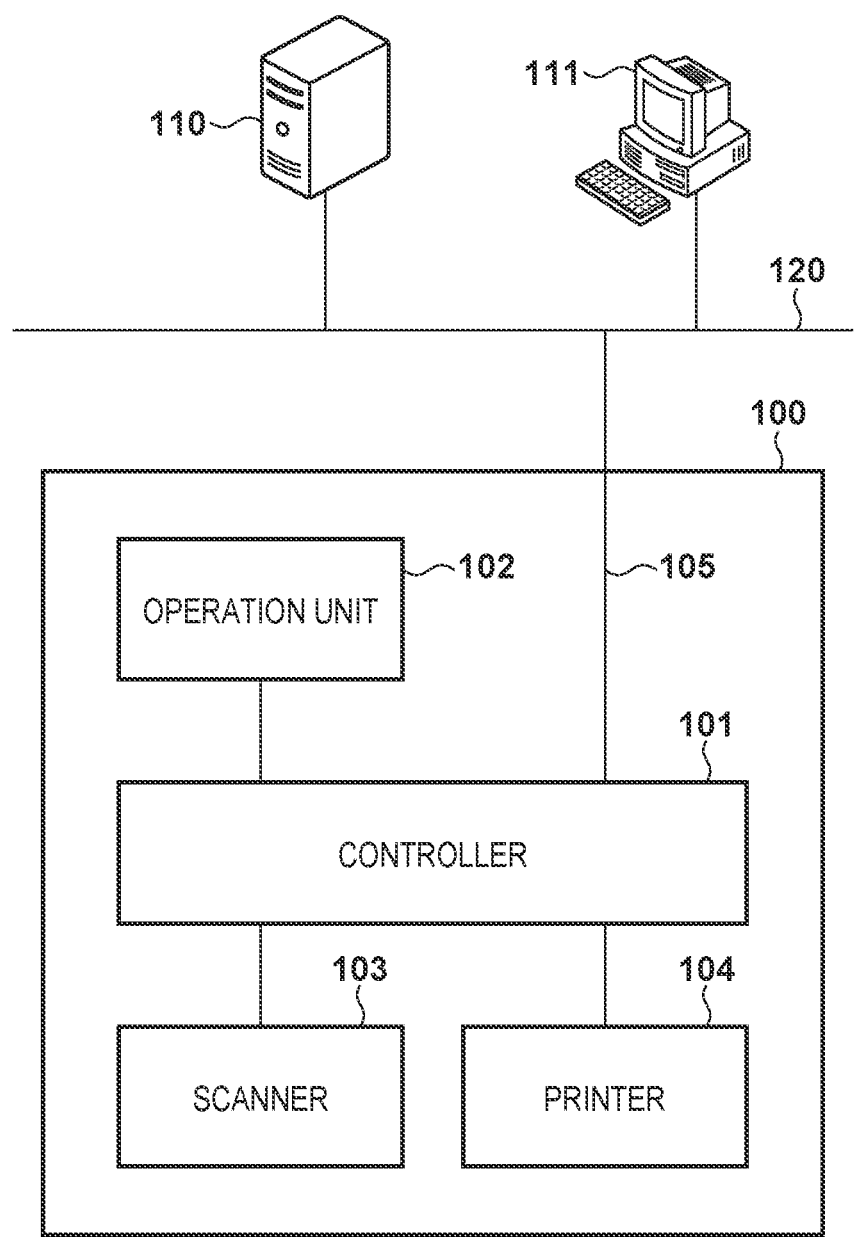
FIG. 1 is a view showing an example of the system configuration of an information processing system.

An information processing system according to this embodiment includes an image processing apparatus 100 as an example of an information processing apparatus, a print server 110, and a client PC 111. The apparatuses are communicably connected to each other via a LAN (Local Area Network) 120. The system configuration shown in FIG. 1 is merely an example for explaining the embodiment, is not intended to limit the present invention, and can include other apparatuses and the like.

The image processing apparatus 100 performs input/output and transmission/reception of an image and related image processing thereof. The image processing apparatus 100 includes a controller 101, an operation unit 102 which serves as a user interface, a scanner 103 which serves as an image input device, and a printer 104 which serves as an image output device. The operation unit 102, the scanner 103, and the printer 104 are connected to the controller 101, and the controller 101 generally controls the operations of the respective units. The controller 101 is connected to the LAN 120 via a network I/F 105 and performs communication with the print server 110 and the client PC 111. A user creates, in a client PC 111, a print job in order to print an image and instructs print processing. As a result, the print job is input to the image processing apparatus 100 via the print server 110 and the LAN 120.

<Configuration of Controller>

Figure 2:
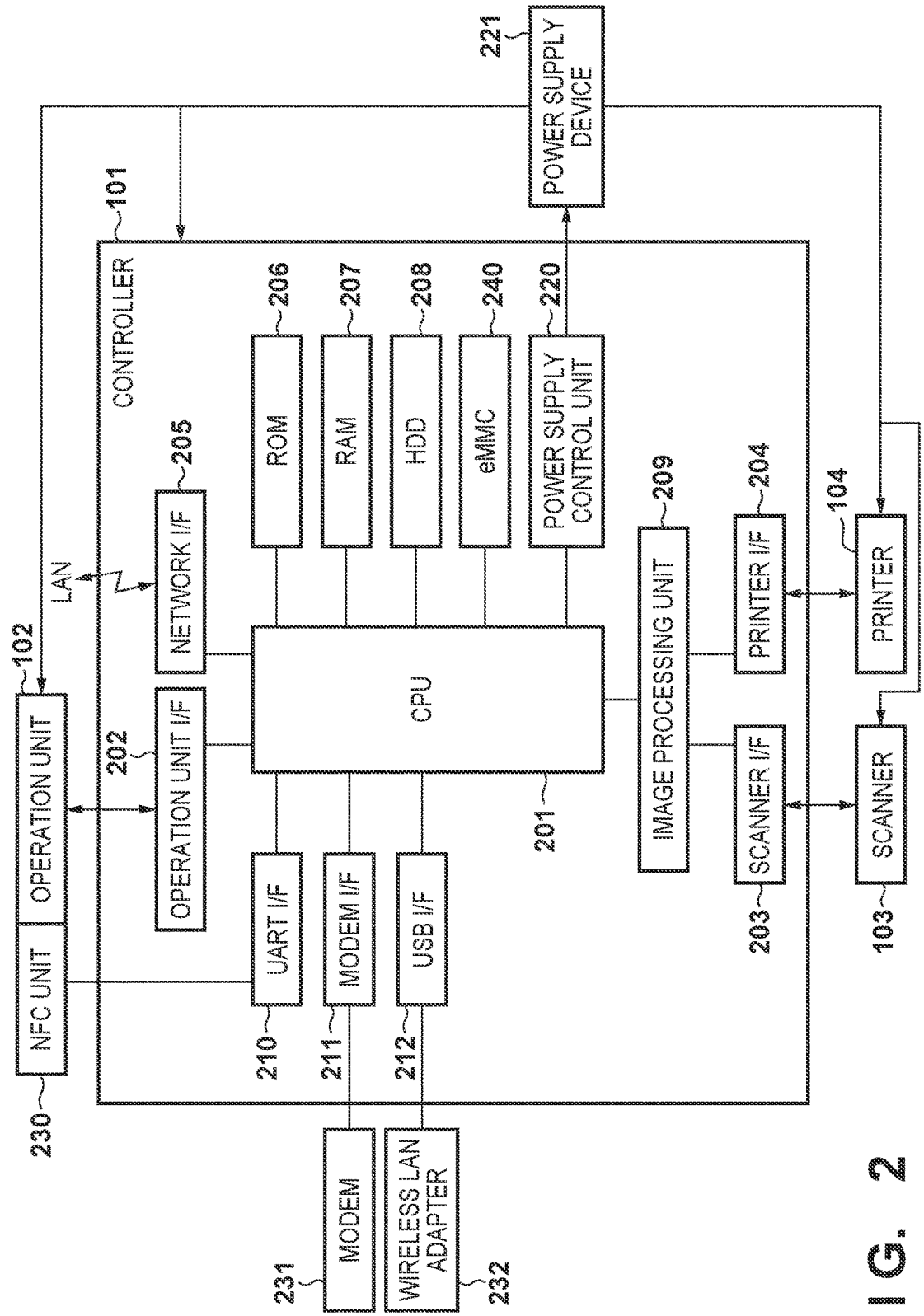
FIG. 2 is a block diagram showing an example of the hardware configuration of a controller.

An example of the configuration of the controller 101 will be described next with reference to FIG. 2. The controller 101 includes a CPU 201, an operation unit I/F 202, a scanner I/F 203, a printer I/F 204, a network I/F 205, a ROM 206, a RAM 207, an HDD (magnetic storage device) 208, an image processing unit 209, a UART I/F 210, a modem I/F 211, a USB I/F 212, a power supply control unit 220, and an eMMC (semiconductor storage device) 240. The controller 101 controls the scanner 103 which is connected to the scanner I/F 203 and the printer 104 which is connected to the printer I/F 204. The controller 101 also performs input/output of image data and device information with an external device via the network I/F 205.

The CPU (Central Processing Unit) 201 is connected to the RAM (Random Access Memory) 207, the ROM (Read Only Memory) 206, the HDD (Hard Disk Drive) 208, and the eMMC (Embedded Multi Media Card) 240 via a system device. Additionally, the CPU 201 is connected to the network I/F 205, the operation unit I/F 202, the UART (Universal Asynchronous Receiver Transmitter) I/F 210, and the modem I/F 211. Furthermore, the CPU 201 is connected to the USB (Universal Serial BUS) I/F 212.

Figure 4:
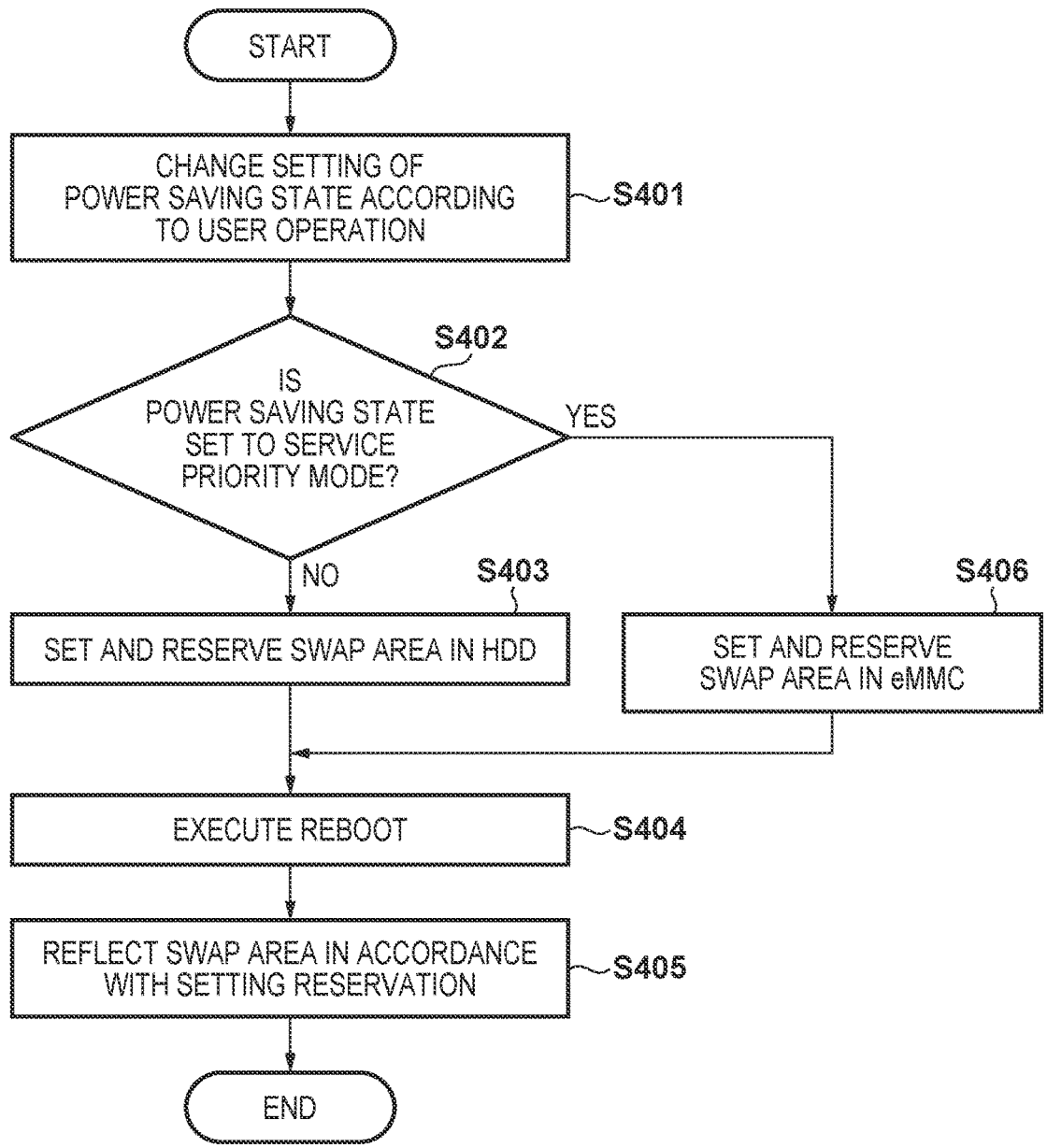
FIG. 4 is a flowchart showing an example of information processing of an image processing apparatus according to an embodiment.
Figure 5:
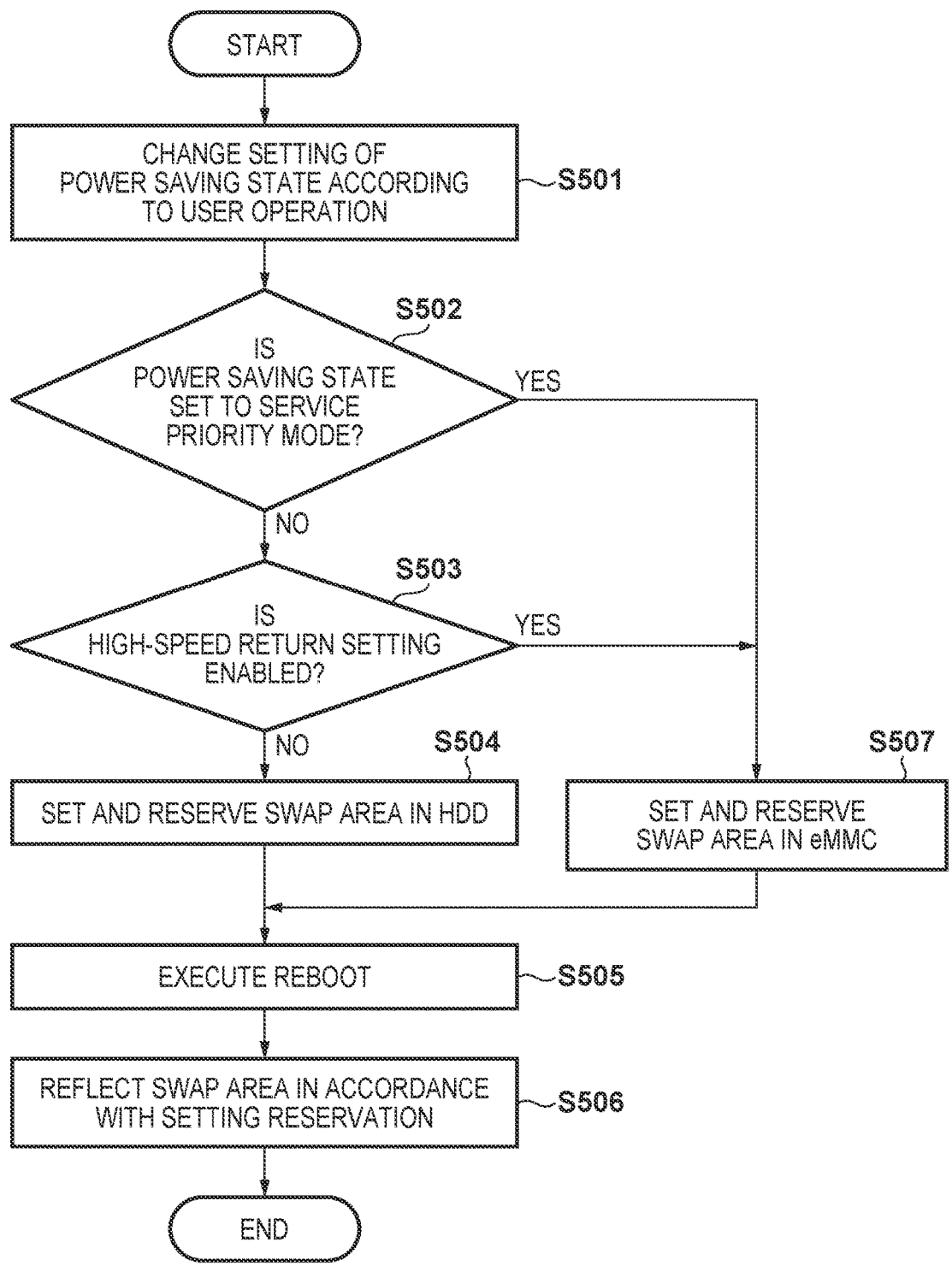
FIG. 5 is a flowchart showing an example of information processing of an image processing apparatus according to another embodiment.

The RAM 207 is a memory which is readable and writable as needed and provides a work area to serve as the main memory of the CPU 201. The RAM 207 is also used as an image memory to temporarily store image data for internal processing. The ROM 206 is a boot ROM and stores a boot program necessary for system activation. The HDD 208 and the eMMC 240 are nonvolatile memories and store an operating system, application programs, and setting data and user data that need to be held even after the power supply of the image processing apparatus 100 is shut off. The functions of the image processing apparatus 100 and processes of the flowcharts of FIGS. 4 and 5 are implemented by the CPU 201 executing corresponding processes based on programs stored in the ROM 206, the HDD 208, the eMMC 240, and the like.

Each of the HDD 208 and the eMMC 240 can provide a swap area for temporarily saving data stored in the RAM 207 when the RAM 207 does not have enough work area. In a Linux® environment which is an operating system, a swap area can be allocated as a dedicated area in each of the HDD 208 and the eMMC 240 during the creation of a partition.

Although the eMMC (Embedded Multi Media Card) 240 has lower power consumption than the HDD 208, it has a short rewriting lifetime. Hence, if the swap area is frequently accessed, the eMMC will reach the end of its lifetime very quickly. On the other hand, since the HDD (Hard Disk Drive) 208 has high power consumption, it is desirable for the power supply to be turned off during a power saving mode in order to increase a power saving effect. That is, if a swap area is provided in the HDD 208, the power saving effect is reduced because the power supply cannot be turned off since access to the swap area occurs even in a power saving state. Therefore, this embodiment provides a mechanism in which the storage device that provides the swap area is switched in accordance with the power saving mode desired by the user.

The network I/F 205 is an interface for connecting to the LAN 120 and performs input/output of data to/from the LAN 120. The operation unit I/F 202 is an interface to perform input/output operations with the operation unit 102 which is formed from a liquid crystal touch panel or the like. The CPU 201 outputs, via the operation unit I/F 202, image data to be displayed to the operation unit 102. The operation unit I/F 202 is also used for transferring, to the CPU 201, data input by the user via the operation unit 102.

The UART I/F 210 is an interface for extending the functions of the image processing apparatus 100. In this embodiment, the UART I/F 210 is used for connecting an NFC unit 230. The NFC unit 230 performs wireless communication with a mobile terminal equipped with NFC (Near Field Communication). As a result, it is possible to perform a pairing operation with a mobile terminal, that is, it is possible to transfer connection information from the side of the image processing apparatus 100 to the mobile terminal. The mobile terminal is an example of a communication terminal.

The modem I/F 211 is an interface for connecting a modem 231 that connects to a public line. By connecting the modem I/F 211 to the modem 231, it becomes possible to perform data input to and output from the public line. The modem 231 is an optional device for extending the functions of the image processing apparatus 100. The modem 231 modulates the image data input from the CPU 201 into a signal compatible with the characteristics of a transfer path of the public line and transmits the signal. The modem 231 also demodulates image data input from the transfer path of the public line and transmits the demodulated image data to the CPU 201. This allows the image processing apparatus 100 to use a facsimile (FAX) function using the public line.

The USB I/F 212 is formed based on a general purpose interface standard and is an interface for extending the functions of the image processing apparatus 100. In this embodiment, the USB I/F 212 is used for connecting a wireless LAN adapter 232. The wireless LAN adapter 232 is an interface to wirelessly connect to the LAN 120. The wireless LAN adapter wirelessly connects, as a client, to an access point on the LAN 120 and allows data input/output between the CPU 201 and the LAN 120.

The wireless LAN adapter 232 can also directly connect the mobile terminal of the user and the wireless LAN and allows data input/output between the CPU 201 and the mobile terminal of the user without intervention of the LAN 120. In this case, although the wireless LAN adapter 232 is connected to the controller 101 using a USB as a general purpose interface, it may be connected to the controller 101 via another general purpose interface such as an SDIO or an UART.

The scanner I/F 203 and the printer I/F 204 are connected to the image processing unit 209. The scanner I/F 203 and the printer I/F 204 are interfaces that respectively connect the scanner 103 and the printer 104 to the controller 101. The image processing unit 209 performs image processing such as correction, processing, editing, and the like to the input image data read from the scanner 103. Subsequently, the image processing unit 209 performs processes such as color conversion, filter processing, and resolution conversion on the print output image data to be output to the printer 104.

Figure 3:
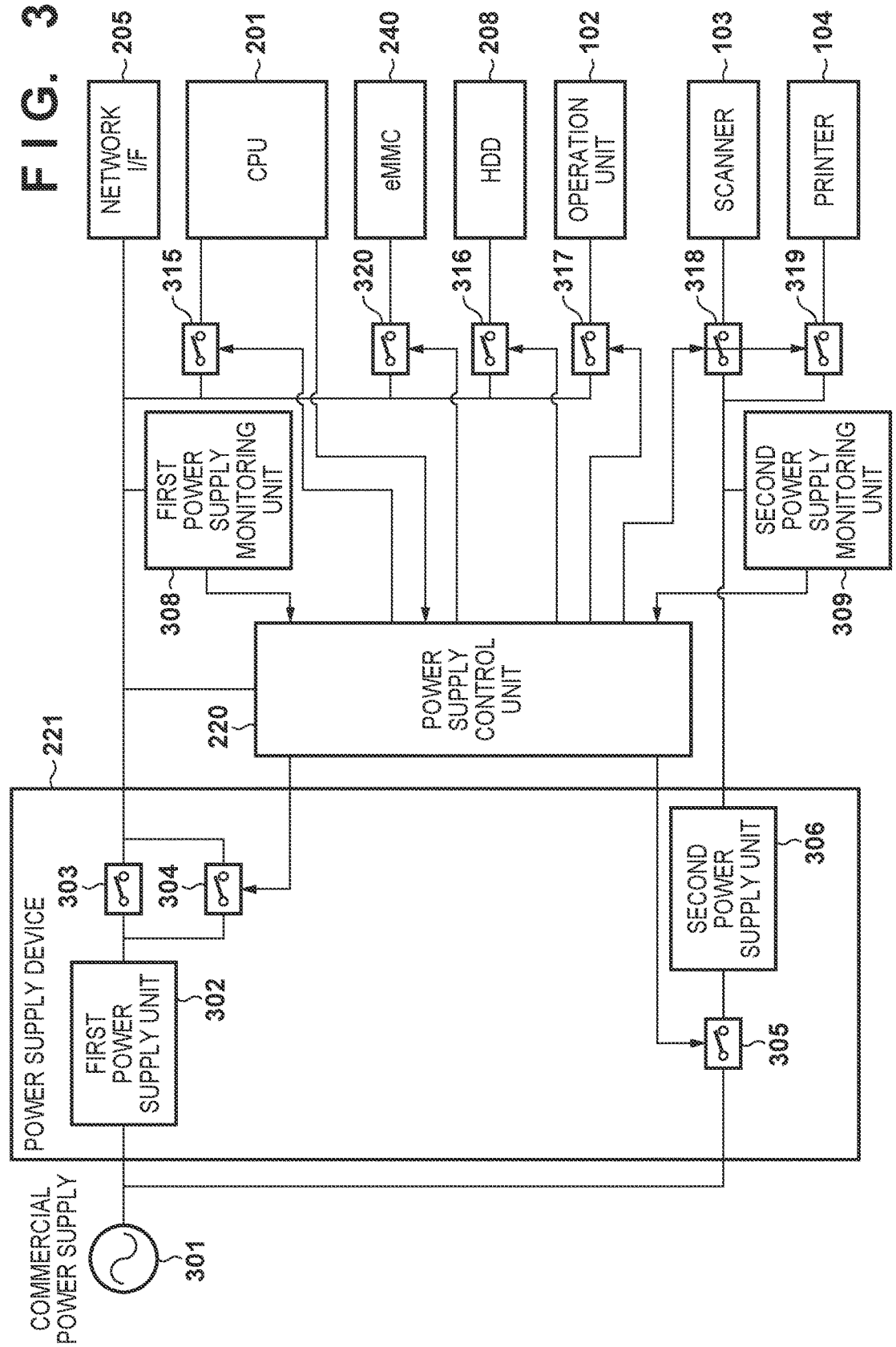
FIG. 3 is a block diagram showing an example of a power supply configuration.

The power supply control unit 220 switches the ON/OFF of a power supply to each unit in accordance with the operation state of the image processing apparatus 100. The power supply control unit 220 receives a control signal from the CPU 201 via the system bus and performs, based on the received control signal, power supply control by transmitting a control signal to a power supply device 221 that supplies power. The power supply device 221 receives power from a commercial power supply and supplies power to each unit of the image processing apparatus 100 based on the control signal received from the power supply control unit 220. A current is applied constantly to the power supply device 221 as long as it is connected to the commercial power supply via a power supply cable, and the power supply device can perform power supply. To output a DC power supply voltage to each unit of the image processing apparatus 100, the power supply device 221 includes a first power supply unit 302 and a second power supply unit 306 that serve as power supply circuits as shown in FIG. 3.

<Power Supply Configuration>

The power supply configuration of the image processing apparatus 100 will be described next with reference to FIG. 3. Reference numeral 301 indicates a commercial power supply. The image processing apparatus 100 receives power from the commercial power supply 301 and supplies power internally to the CPU 201, the eMMC 240, the HDD 208, the operation unit 102, the scanner 103, the printer 104, the network I/F 205, and the like.

The first power supply unit 302 is connected to the commercial power supply 301, and a current is applied constantly to the first power supply unit as long as it is connected to the commercial power supply 301 via the power supply cable. The first power supply unit 302 generates, for example, a DC power supply voltage (for example, +5.14 V±3%) by performing AC-DC conversion on the power received from the commercial power supply 301, and performs power supply to each connected unit.

A switch 303 serves as a main power supply switch that is accessible (operable) by the user. The switch 303 is connected to the power supply control unit 220, and the power supply control unit 220 detects whether the user has turned on or off the switch 303. A switch 304 is a switch used to continue the power supply to the power supply control unit 220 when the switch 303 is turned off by the user. When the switch 303 is turned off by the user, the CPU 201 detects that the switch 303 is OFF via the power supply control unit 220, and software operating on the CPU 201 starts shutdown processing. After the software operating on the CPU 201 ends the shutdown processing, the power supply control unit 220 turns off the switch 304. As a result, the switches 303 and 304 are both turned off, and the power supply from the first power supply unit 302 is shut off.

The second power supply unit 306 is connected to the commercial power supply 301 via a switch 305. A current is applied to the second power supply unit 306 when the power supply control unit 220 turns on/off the switch 305 in accordance with the control of the software operating on the CPU 201. The second power supply unit 306 generates a DC power supply voltage (for example, +12.3 V±4%) by performing AC-DC conversion on the power received from the commercial power supply 301 and performs power supply to each connected unit.

The power supply control unit 220 is also connected to the switch 304, the switch 305, and switches 315 to 320 and performs ON/OFF control of the respective switches to control the power supply from the first power supply unit 302 and the power supply from the second power supply unit 306. The first power supply monitoring unit 308 monitors the power supply of the first power supply unit 302, and the second power supply monitoring unit 309 monitors the output voltage of the second power supply unit 306. In addition, when each of the first power supply monitoring unit 308 and the second power supply monitoring unit 309 detects that the monitored output voltage which has exceeded a predetermined threshold has been applied, it asserts a power good signal to the power supply control unit 220. Furthermore, when the state changes from a voltage applied state to a state in which the voltage is below the threshold, the power good signal is deasserted.

The CPU 201 is connected to the switch 315. The switch 316 is connected to the HDD 208. The operation unit 102 is connected to the switch 317. The scanner 103 is connected to the switch 318. The printer 104 is connected to the switch 319. The eMMC 240 is connected to the switch 320. Each of the switches 315 to 320 controls, based on the signal from the power supply control unit 220, the power supply to the corresponding component to which it is connected.

Here, the sequence when the image forming system changes from a power supply OFF state to a power supply ON state will be described. When the switch 303 is turned on by the user, power is supplied, via the switch 303, from the first power supply unit 302 to some parts such as the power supply control unit 220, a part of the CPU 201, the memory, and the like. Subsequently, when the first power supply monitoring unit 308 detects that power has stabilized, a power good signal is output from the first power supply monitoring unit 308 to the power supply control unit 220.

The power supply control unit 220 receives the power good signal from the first power supply monitoring unit 308 and turns on the switches 304 and 317. As a result, power is supplied from the first power supply unit 302 to some parts such as the network I/F 205, the CPU 201, the eMMC 240, the HDD 208, and operation unit 102.

Next, the power supply control unit 220 turns on the switch 305. As a result, power is supplied from the second power supply unit 306 to the scanner 103 and the printer 104. Subsequently, when the second power supply monitoring unit 309 detects that the power has stabilized, the power good signal is output from the second power supply monitoring unit 309 to the power supply control unit 220. Furthermore, if a print job or the like is not performed for a predetermined time, the image processing apparatus 100 transitions to various types of power saving modes.

Power Saving Operation of Image Processing Apparatus

Here, the power saving operation of the image processing apparatus will be described. The image processing apparatus 100 includes, as operation states, a normal state and a plurality of power saving states (power saving modes). In a normal state, the power supply device 221 performs power supply to the respective units of the controller 101, the operation unit 102, the scanner 103, and the printer 104. In addition, the CPU 201 controls the power supply control unit 220 so that power supply to each unit is enabled. In the normal state, the user can use a function such as scanning or printing of the image processing apparatus 100.

In a power saving state, the power supply device 221 performs power supply to the power supply control unit 220. In addition, the CPU 201 controls the power supply control unit 220 so that the power supply to some parts of the controller 101 is enabled and the power supply to the operation unit 102, the scanner 103, and the printer 104 is disabled. In this case, the power supply control unit 220 turns off the switches 317 to 319 that are connected to the power supply line and shuts off the power supply. In the power saving state, the image processing apparatus 100 transitions to the normal state when the power supply control unit 220 detects that a button of the operation unit 102 has been pressed by the user or data has been received from a network.

Figure 7B:
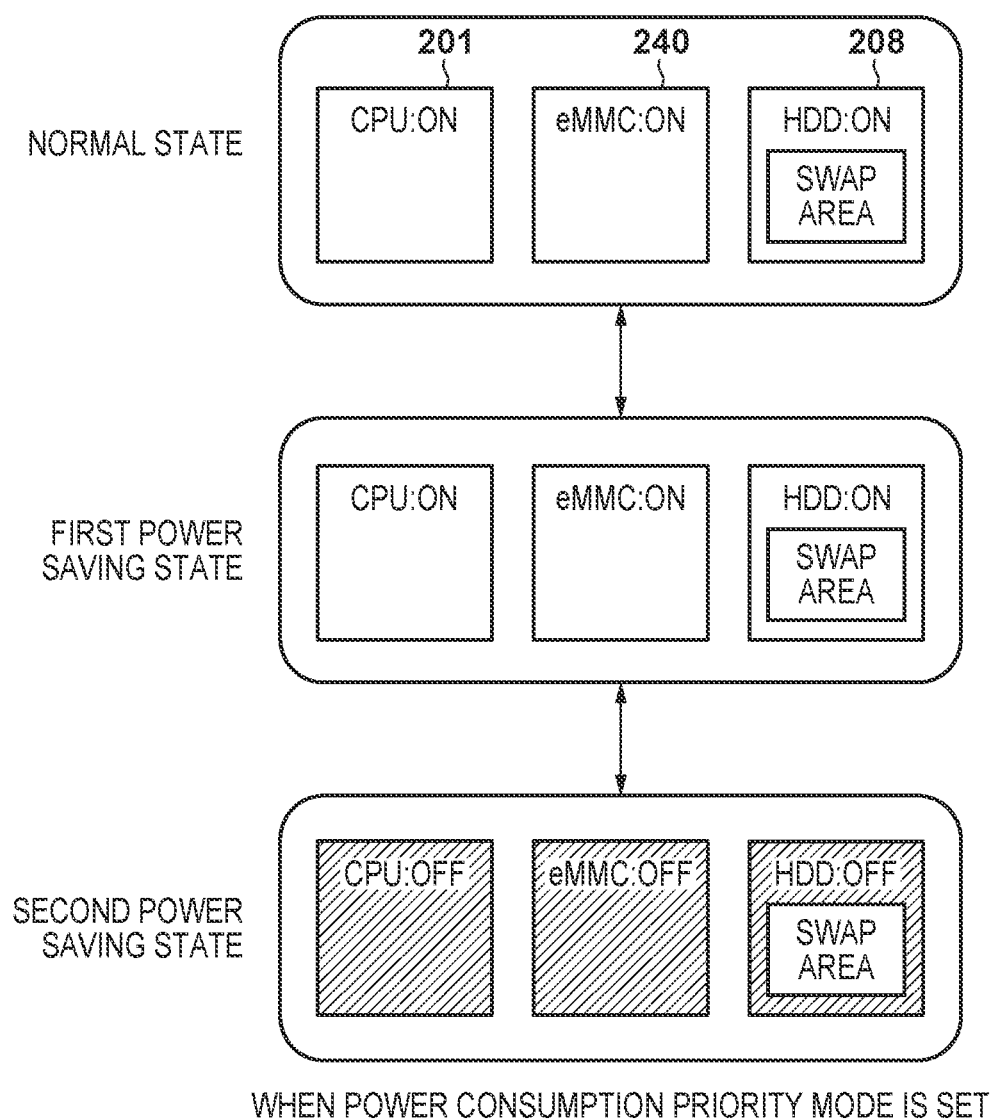

Additionally, as shown in FIGS. 7A and 7B, the power saving modes according to this embodiment include a service priority mode as a first power saving mode that allows network communication and a power consumption priority mode as a second power saving mode that further reduces the power consumption in the power saving state. That is, the power consumed by the image processing apparatus 100 is set as the service priority mode >the power consumption priority mode. These power saving states can be set by a user input.

In the service priority mode, the power is supplied to the power supply control unit 220, the CPU 201, the RAM 207, the eMMC 240, and the network I/F 205 of the controller 101. Here, the CPU 201 controls the power supply control unit 220 so that the power supply to the HDD 208 is disabled. The power supply control unit 220 turns off the switch 316 connected to the power supply line and shuts off the power supply. If the power saving state is set to the service priority mode, the operation state can transition to only the service priority mode and does not transition to the power consumption priority mode, as shown in FIG. 7A. Also, in the service priority mode, the CPU 201 can respond to the network packet received via the network I/F 205. For example, the CPU can respond to a packet transmitted from the client PC 111 to confirm whether the image processing apparatus 100 is connected to the LAN 120. On the other hand, if the CPU 201 receives a print job or the like transmitted from the client PC 111, the operation state returns from the service priority mode to the normal state to perform printing.

In the power consumption priority mode, power supply is performed to the power supply control unit 220, the RAM 207, and the network I/F 205 of the controller 101, and power consumption is reduced by shutting off the power supply to the CPU 201 and the eMMC 240 to which the power supply was performed in the service priority mode. In the power consumption priority mode, the power supply to an optional device is shut off. Hence, a predetermined power consumption state is implemented regardless of the connection state of the optional device, and power saving specifications can be observed. If the power saving state is set to the power consumption priority mode, the operation state can transition to both the service priority mode and the power consumption priority mode, as shown in FIG. 7B.

The end of a print job or the elapse of a predetermined time is a condition in which the operation state transitions from the normal state to the service priority mode. Alternatively, the operation state can transition to the service priority mode when a user presses a predetermined button of the operation unit 102. Furthermore, in the service priority mode, the operation state transitions to the power consumption priority mode when data reception from the network I/F 205 has not been continued for a predetermined time.

<Control Sequence of Image Processing Apparatus>

Swap area switching processing by the image processing apparatus 100 will be described next with reference to FIG. 4. A swap area is an area where data stored in the RAM 207 is temporarily saved when the RAM 207 does not have enough work area and is an area necessary for the operating system to operate. Among the power saving states of the image processing apparatus 100, the service priority mode requires access to the swap area because the operating system is in an operating state. Hence, the swap area must be kept accessible by performing power supply to the storage device that stores the swap area. On the other hand, in the power consumption priority mode, since access to the swap area does not occur because the operating system is in a suspended state, the power supply to the storage device in which the swap area is allocated can be shut off. Hence, the storage device to perform power supply is selected by performing, in accordance with the setting of the power saving state set by the user, control to switch the storage device that is to provide the swap area.

Figure 6:
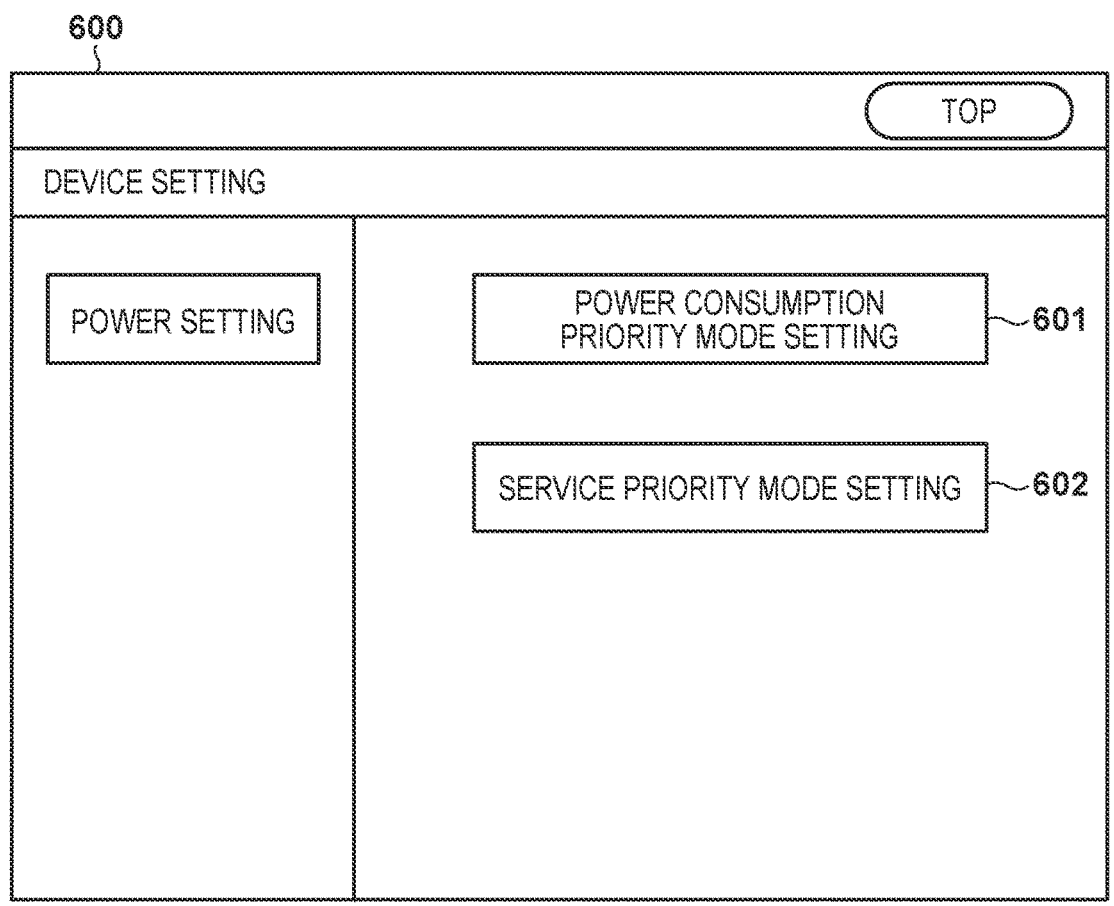
FIG. 6 is a view showing an example of a setting screen.

In the flowchart shown in FIG. 4, processing is started when the user switches, during the normal operation, the setting of the power saving state in a device setting screen 600, which is shown in FIG. 6, displayed on the operation unit 102 of the image processing apparatus 100. The device setting screen 600 includes, as power settings, a button 601 for setting the power consumption priority mode and a button 602 for setting the service priority mode. These buttons can be selected to switch the settings of the power saving state. In step S401, the CPU 201 changes the setting of the power saving state upon detecting that the operation unit 102 displaying the device setting screen 600 has been operated. The setting of the power saving state is stored in the storage device which is the eMMC 240 in this case.

Next, in step S402, the CPU 201 confirms the set power saving state and determines whether the set power saving state is the service priority mode or the power consumption priority mode. If the service priority mode has been set, the process advances to step S406. The CPU 201 sets and reserves the eMMC 240 to serve as the storage device to provide the swap area, and the process advances to step S404. A setting reservation is stored in an area which is used to refer to the data of the eMMC 240 when the boot program is executed at the time of system activation and during the execution of the program. This stored information is for the boot program to switch the activation processing in accordance with the setting. Then, in step S404, the CPU 201 reboots the system to enable the setting. Subsequently, in step S405, the CPU 201 sets the swap area in the eMMC 240 in accordance with the information of the setting reservation when a partition of the storage device is created (during initialization processing) at the time of reactivation, and the process ends. If the setting of the power saving state is the service priority mode, it is possible to shut off the power supply to the HDD 208 during the power saving state and reduce power consumption by providing the swap area in the eMMC 240.

On the other hand, if it is determined that the power consumption priority mode is set in step S402, the process advances to step S403, and the CPU 201 sets and reserves the HDD 208 to serve as the storage device to provide the swap area. Then, in step S404, the CPU 201 reboots the system to enable the setting. Subsequently, in step S405, the CPU 201 sets the swap area in the HDD 208 when a partition of the storage device is created at the time of reactivation, and the process ends. If the setting of the power saving state is the power consumption priority mode, differences in power consumption are not created whichever storage device provides the swap area because the power supply to each of the storage devices is shut off during the power saving state. Hence, to reduce the consumption of the rewriting lifetime of the eMMC 240 during the normal operation or the like, the swap area is provided in the HDD 208.

As described above, the image processing apparatus (information processing apparatus) according to this embodiment includes two storage devices, the semiconductor storage device and the magnetic storage device, and controls, in correspondence with the power saving mode set according to a user input, which storage device is to provide the swap area. In this manner, according to this embodiment, the storage device which is to provide the swap area can be switched in accordance with the setting of the power saving state set by the user. Therefore, it is possible to perform network communication by reducing the power of the HDD 208 when the power saving state is the service priority mode. In addition, in the power consumption priority mode, it is possible to suppress the consumption of the rewriting lifetime of the eMMC 240.

<Second Embodiment>

The second embodiment of the present invention will be described below. In this embodiment, in addition to the settings of the above-described first embodiment, a configuration that sets a return speed when the operation state returns from a power saving state will be further described.

The procedure of processing in which an image processing apparatus 100 switches a swap area will be described with reference to FIG. 5. Here, in addition to the setting of the power saving state, setting of a return speed when the operation state returns from the power saving state will be described.

Figure 8:
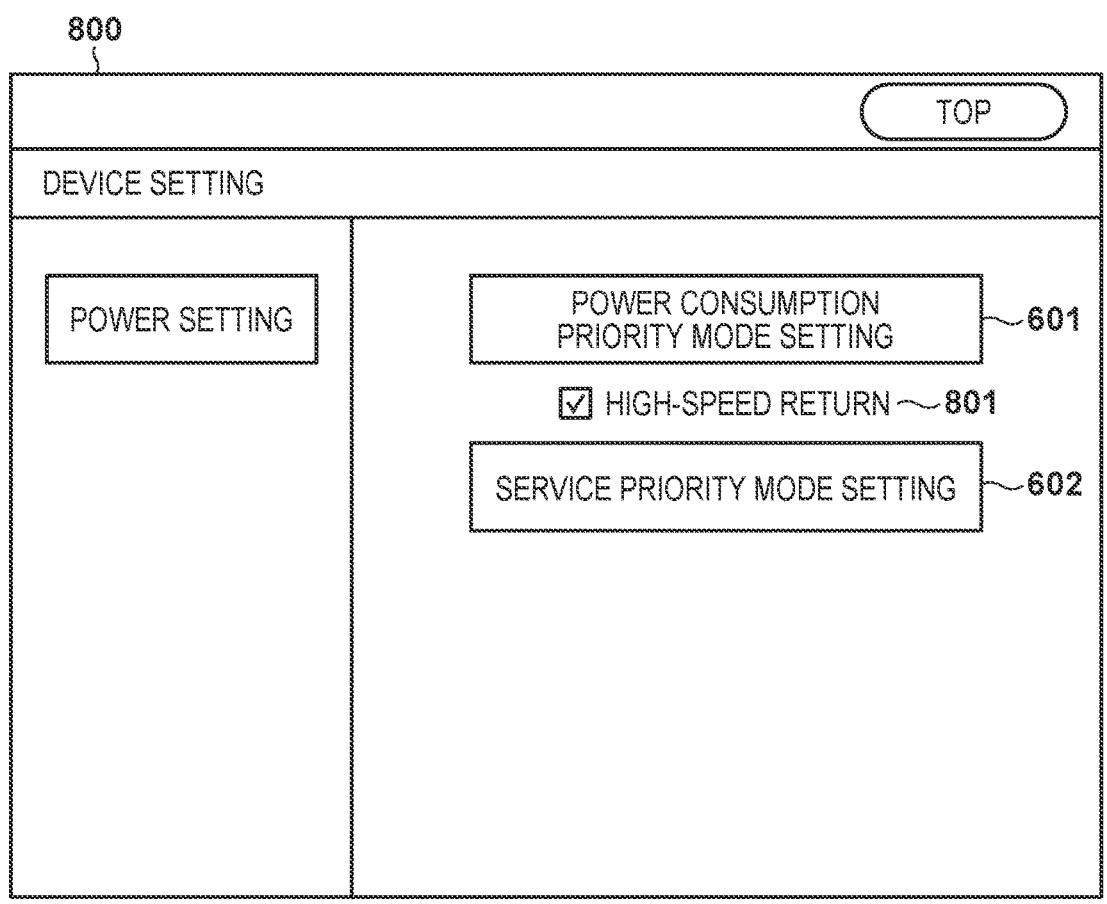
FIG. 8 is a view showing an example of a setting screen.

In the flowchart shown in FIG. 5, processing is started when a user switches, during a normal operation, the setting of the power saving state and the high-speed return setting in a device setting screen 800, which is shown in FIG. 8, displayed on an operation unit 102 of the image processing apparatus 100. In addition to buttons 601 and 602 shown in FIG. 6, the device setting screen 800 further includes, as power settings, a check box 801 for setting a high-speed return in the case of a power consumption priority mode. When the button 601 is selected in a state in which the check box 801 is checked, the power consumption priority mode can be selected with the high-speed return settings for performing a high-speed return from a power saving state. In step S501, the CPU 201 changes the setting of the power saving state upon detecting that the operation unit 102 displaying the device setting screen 800 has been operated.

Next, in step S502, the CPU 201 confirms the set power saving state and determines whether the set power saving state is a service priority mode or the power consumption priority mode. If the power consumption priority mode is set, the process advances to step S503, and the CPU 201 confirms whether the high-speed return setting has been enabled or disabled. Here, if the high-speed return setting has been enabled, the process advances to step S507. Otherwise, the process advances to step S504.

In step S504, since the set power saving state is the power consumption priority mode and the high-speed return setting is disabled, the CPU 201 sets and reserves an HDD 208 as the storage device to provide a swap area. Then, in step S505, the CPU 201 reboots the system to enable the setting. Subsequently, in step S506, the swap area for creating a partition of the storage device at the time of activation is set in the HDD 208, and the process ends.

On the other hand, if the power saving state is the service priority mode in step S502 or the high-speed return setting has been enabled in step S503, the process advances to step S507, and the CPU 201 sets and reserves an eMMC 240 as the storage device to provide the swap area. Then, in step S505, the CPU 201 reboots the system to enable the setting. Subsequently, in step S506, the CPU 201 sets the swap area for creating a partition of the storage device at the time of activation in the eMMC 240, and the process ends. Even when the power saving state is the power consumption priority mode, if the high-speed return setting has been enabled, the return time speed of the storage device at a return becomes associated. Hence, the swap area in the eMMC 240 can be provided to allow the system to return without waiting for the spin-up time of the HDD 208.

In at least one of the embodiments above, when returning from the power saving state to a normal state, the image processing apparatus does not have to change the swap area from the SSD to the HDD every time. As a result, while transitioning and returning between the normal state and the power saving state, a large amount of data processing does not occur, and the transition time and the return time are shortened. In addition, because changing the swap area when transitioning to or returning from a sleep state does not occur, the rewriting lifetime of the SSD may be prolonged. Thus, in a system in which the swap area is to be allocated at the time of activation, the embodiment enable the system not to change the swap area so often after the activation.

As described above, according to this embodiment, the storage device which is to provide the swap area can be selected in accordance with the setting of the power saving state and the setting of the return speed set by the user. Therefore, even in the power consumption priority mode, providing the swap area in the eMMC 240 allows the system to return without waiting for the spin-up time of the HDD 208, and it is possible to shorten the return time. For example, by implementing at least one embodiments above, when the image processing apparatus is to transition to a power saving state, a time consuming control is not needed to change the swap area from the HDD to the SSD, stop access to the HDD, and turn off the power supply of the HDD.

Furthermore, among the image processing apparatuses, there is an apparatus that has a plurality of power saving states. In this case, in a first power saving state which is a shallow sleep state, it is necessary to continue applying a current to at least an auxiliary storage apparatus to which a swap area has been allocated so that a network service can continue. Meanwhile, in a second power saving state which is a deep sleep state, there is a demand to increase the power saving effect by turning off the application of a current to the auxiliary storage device to which the swap area has been allocated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-123989 filed on Jun. 22, 2016, which is hereby incorporated by reference herein in its entirety.

What is claimed is:

1. An information processing apparatus configured to transition to one of a plurality of power saving states of which power consumption is lower than a normal power state, comprising:
    a semiconductor storage device;
    a magnetic storage device; and
    a controller including a memory storing instructions and a processor which executes the instructions, the controller configured to:
        set a first setting for a priority mode including a service priority mode or a power consumption priority mode in accordance with a user input, the service priority mode configured to transition the information processing apparatus to a first power saving state from a normal power state and the power consumption priority mode configured to transition the information processing apparatus to the first power saving state or a second power saving state from the normal power state, power consumption in the second power saving state being lower than power consumption in the first power saving state;
        determine whether a second setting enabling a high-speed return from a power saving state is set when the priority mode is set to the power consumption priority mode; and
        configure a swap area in the semiconductor storage device or the magnetic storage device based on the set priority mode,
        wherein the swap area in the semiconductor storage device or the magnetic storage device is configured in accordance with activation of the information processing apparatus,
        wherein, in a case where the high-speed return setting is enabled in the power consumption priority mode, the controller is further configured to configure the swap area in the semiconductor storage device, and
        wherein, in the first power saving state, power is supplied to the storage device where the swap area is configured.

2. The apparatus according to claim 1, wherein the controller is further configured to, in accordance with the set priority mode, reserve the semiconductor storage device or the magnetic storage device to provide the swap area, reboot the information processing apparatus, and provide the swap area in the semiconductor storage device or the magnetic storage device reserved in initialization processing at the time of reactivation.

3. The apparatus according to claim 1, wherein the semiconductor storage device comprises an eMMC (Embedded Multi Media Card) and the magnetic storage device comprises an HDD (Hard Disk Drive).

4. The apparatus according to claim 1, wherein,
    in a case where the apparatus transitions from the normal power state to the first power saving state, the operating system is in an operating state, power is not supplied to the magnetic storage device when the service priority mode is set or when the high speed return is enabled in the power consumption priority mode, and power is supplied to at least the processor and the semiconductor storage device, and
    in a case where the apparatus transitions from the normal power state to the second power saving state due to the high-speed return being disabled in the power consumption priority mode and the operating system being in a suspended state, power is not supplied to the semiconductor storage device, the magnetic storage device, and the processor.

5. The apparatus according to claim 1, wherein the controller is further configured to configure the swap area in the semiconductor storage device in the service priority mode, and configure the swap area in the magnetic storage device in the power consumption priority mode when the high-speed return setting is not enabled.

6. The apparatus according to claim 1, further comprising a display,
    wherein the display is configured to accept the user input.

7. The apparatus according to claim 1, wherein the swap area is an area for temporarily holding data in a case where lack of the memory occurs.

8. A control method of an information processing apparatus that includes a semiconductor storage device and a magnetic storage device and that is configured to transition to one of a plurality of power saving states of which power consumption is lower than a normal power state, comprising:
    setting a first setting for a priority mode including a service priority mode or a power consumption priority mode in accordance with a user input, the service priority mode configured to transition the information processing apparatus to a first power saving state from a normal power state and the power consumption priority mode configured to transition the information processing apparatus to the first power saving state or a second power saving state from the normal power state, power consumption in the second power saving state being lower than power consumption in the first power saving state;
    determining whether a second setting enabling a high-speed return from a power saving state is set when the priority mode is set to the power consumption priority mode; and
    configuring a swap area in the semiconductor storage device or the magnetic storage device based on the set priority mode, wherein the swap area in the semiconductor storage device or the magnetic storage device is configured in accordance with activation of the information processing apparatus;

wherein, in a case where the high-speed return setting is enabled in the power consumption priority mode, the swap area is configured in the semiconductor storage device; and wherein, in the first power saving state, power is supplied to the storage device where the swap area is configured.

9. A non-transitory computer readable storage medium storing a computer program for causing a computer to execute each step of a control method of an information processing apparatus that includes a semiconductor storage device and a magnetic storage device and that is configured to transition to one of a plurality of power saving states of which power consumption is lower than a normal power state, the method comprising:

setting a first setting for a priority mode including a service priority mode or a power consumption priority mode in accordance with a user input, the service priority mode configured to transition the information processing apparatus to a first power saving state from a normal power state and the power consumption priority mode configured to transition the information processing apparatus to the first power saving state or a second power saving state from the normal power state, power consumption in the second power saving state being lower than power consumption in the first power saving state;

determining whether a second setting enabling a high-speed return from a power saving state is set when the priority mode is set to the power consumption priority mode; and configuring a swap area in the semiconductor storage device or the magnetic storage device based on the set priority mode, wherein the swap area in the semiconductor storage device or the magnetic storage device is configured in accordance with activation of the information processing apparatus;

wherein, in a case where the high-speed return setting is enabled in the power consumption priority mode, the swap area is configured in the semiconductor storage device; and wherein, in the first power saving state, power is supplied to the storage device where the swap area is configured.

* * * * *